United States Patent
Kanza et al.

(10) Patent No.: US 12,149,552 B2
(45) Date of Patent: Nov. 19, 2024

(54) IMPLEMENTING NETWORK SECURITY RULES IN HOME ROUTERS

(71) Applicant: AT&T Intellectual Property I, L.P., Atlanta, GA (US)

(72) Inventors: Yaron Kanza, Fair Lawn, NJ (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 233 days.

(21) Appl. No.: 17/935,812

(22) Filed: Sep. 27, 2022

(65) Prior Publication Data

US 2024/0106842 A1    Mar. 28, 2024

(51) Int. Cl.
*H04L 9/40* (2022.01)
*H04L 43/062* (2022.01)

(52) U.S. Cl.
CPC ........ *H04L 63/1425* (2013.01); *H04L 43/062* (2013.01); *H04L 63/0263* (2013.01)

(58) Field of Classification Search
CPC ............... H04L 63/1425; H04L 43/062; H04L 63/0263; H04L 41/145
See application file for complete search history.

(56) References Cited

U.S. PATENT DOCUMENTS

| | | | | |
|---|---|---|---|---|
| 8,582,567 | B2* | 11/2013 | Kurapati | H04M 7/0078 370/352 |
| 2006/0285665 | A1* | 12/2006 | Wasserblat | G06Q 20/4016 704/E17.002 |
| 2009/0100518 | A1* | 4/2009 | Overcash | G06F 21/552 726/22 |
| 2009/0254970 | A1* | 10/2009 | Agarwal | G06F 21/554 726/1 |
| 2017/0279838 | A1* | 9/2017 | Dasgupta | H04L 63/1425 |
| 2021/0210072 | A1* | 7/2021 | Parc | G10L 15/07 |
| 2022/0247678 | A1* | 8/2022 | Atwal | H04L 45/645 |
| 2024/0106842 | A1* | 3/2024 | Kanza | H04L 43/062 |

\* cited by examiner

*Primary Examiner* — El Hadji M Sall (57) ABSTRACT

In one example, the present disclosure describes a device, computer-readable medium, and method for implementing programmable security specifications in home routers. For instance, in one example, a method performed by a processing system including at least one processor includes monitoring network traffic flowing into and out of a home network that is connected to a core network via a gateway device, constructing a model of network traffic flowing into and out of the home network, based on the monitoring, detecting an anomaly in the model of the network traffic, generating a rule based on the anomaly, where the rule specifies an action to be taken when a match condition related to the anomaly is detected, and deploying the rule on the gateway device.

20 Claims, 4 Drawing Sheets

IMPLEMENTING NETWORK SECURITY RULES IN HOME ROUTERS

The present disclosure relates generally to network security, and relates more particularly to devices, non-transitory computer-readable media, and methods for implementing programmable security specifications in home routers.

BACKGROUND

Network security involves the protection of communications networks against the theft and/or misappropriation of network resources (e.g., hardware, software, services) and data (e.g., electronic customer data). Threats to network security may include, for example, distributed denial of service (DDoS) attacks which hijack multiple network connected devices in multiple geographic locations and then utilize those devices to flood a targeted server with network traffic in an attempt to disrupt the normal functioning of the targeted server. Threats may also include phishing, in which fraudulent communications purporting to come from reputable sources attempt to trick users into revealing sensitive information, such as financial data, passwords, and other information. Threats may also include identity theft, in which a user's personal information may be intercepted and used to impersonate the user for the purposes of fraudulently obtaining goods and/or services.

SUMMARY

In one example, the present disclosure describes a device, computer-readable medium, and method for implementing programmable security specifications in home routers. For instance, in one example, a method performed by a processing system including at least one processor includes monitoring network traffic flowing into and out of a home network that is connected to a core network via a gateway device, constructing a model of network traffic flowing into and out of the home network, based on the monitoring, detecting an anomaly in the model of the network traffic, generating a rule based on the anomaly, where the rule specifies an action to be taken when a match condition related to the anomaly is detected, and deploying the rule on the gateway device.

In another example, a non-transitory computer-readable medium stores instructions which, when executed by a processing system including at least one processor, cause the processing system to perform operations. The operations include monitoring network traffic flowing into and out of a home network that is connected to a core network via a gateway device, constructing a model of network traffic flowing into and out of the home network, based on the monitoring, detecting an anomaly in the model of the network traffic, generating a rule based on the anomaly, where the rule specifies an action to be taken when a match condition related to the anomaly is detected, and deploying the rule on the gateway device.

In another example, a system includes a processing system including at least one processor and a non-transitory computer-readable medium storing instructions which, when executed by the processing system, cause the processing system to perform operations. The operations include monitoring network traffic flowing into and out of a home network that is connected to a core network via a gateway device, constructing a model of network traffic flowing into and out of the home network, based on the monitoring, detecting an anomaly in the model of the network traffic, generating a rule based on the anomaly, where the rule specifies an action to be taken when a match condition related to the anomaly is detected, and deploying the rule on the gateway device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a system, method, and non-transitory computer readable medium for implementing programmable security specifications in home routers. As discussed above, network security involves the protection of communications networks against the theft and/or misappropriation of network resources (e.g., hardware, software, services) and data (e.g., electronic customer data). Threats to network security may include, for example, distributed denial of service (DDoS) attacks which hijack multiple network connected devices in multiple geographic locations and then utilize those devices to flood a targeted server with network traffic in an attempt to disrupt the normal functioning of the targeted server. Threats may also include phishing, in which fraudulent communications purporting to come from reputable sources attempt to trick users into revealing sensitive information, such as financial data, passwords, and other information. Threats may also include identity theft, in which a user's personal information may be intercepted and used to impersonate the user for the purposes of fraudulently obtaining goods and/or services.

Many types of network threats, including the types discussed above, can be thwarted or at least mitigated on the home network side, e.g., by a home gateway of a user's home network. For instance, as discussed above, DDoS attacks rely on the use of network connected devices that have been hacked and remotely controlled to generate large amounts of network traffic destined for a targeted server. These network connected devices may include servers, but may also include user endpoint devices located in home networks such as desktop computers, laptop computers, and even Internet of Things (IoT) devices. Because the network connected devices reside in different geographic locations, there is no single attack source that can be blocked to stop the attack; the individual network connected devices must be prevented from sending traffic to the targeted server. However, configuring a home gateway to block and mitigate attacks is a nontrivial task, since attack patterns are constantly evolving and the average home network users do not typically possess the expertise necessary to configure complex security definitions on their home gateway.

Examples of the present disclosure use machine learning to learn expected behavior patterns of a telecommunications network, both on the home network side and the global network side. Then, when anomalous behaviors are detected, these anomalous behaviors may be automatically translated into security specifications (e.g., programming protocol-independent packet processors (P4) specifications, or specifications in any other programming languages for controlling packet forwarding planes in network connected devices). The security specifications are deployed in the home gateway of a home network that is part of the telecommunications network. The security specifications may help to mitigate security threats to the telecommunications network. For instance, many types of network security threats, including distributed denial of service (DDoS) attacks, phishing attempts, identity theft, and the like can be blocked or at least mitigated at the home gateway, as long as the home gateway is configured to detect packets and flows that are part of such security threats and to apply countermeasures (e.g., dropping packets, delaying packets, marking packets as suspicious, etc.).

The disclosed approach not only makes the home network more secure, but also makes the wider telecommunications network more resilient to attacks that rely on the exploitation of compromised network connected devices in the home network. Furthermore, because examples of the present disclosure can prevent compromised network connected devices from being exploited for attacks, the risk that the Internet Protocol (IP) addresses of these compromised network connected devices will be added to network blacklists (and, consequently, that users of the compromised network connected devices may be denied access to required services) is also reduced. These and other aspects of the present disclosure are discussed in further detail with reference to FIGS. 1-4, below.

Figure 1:
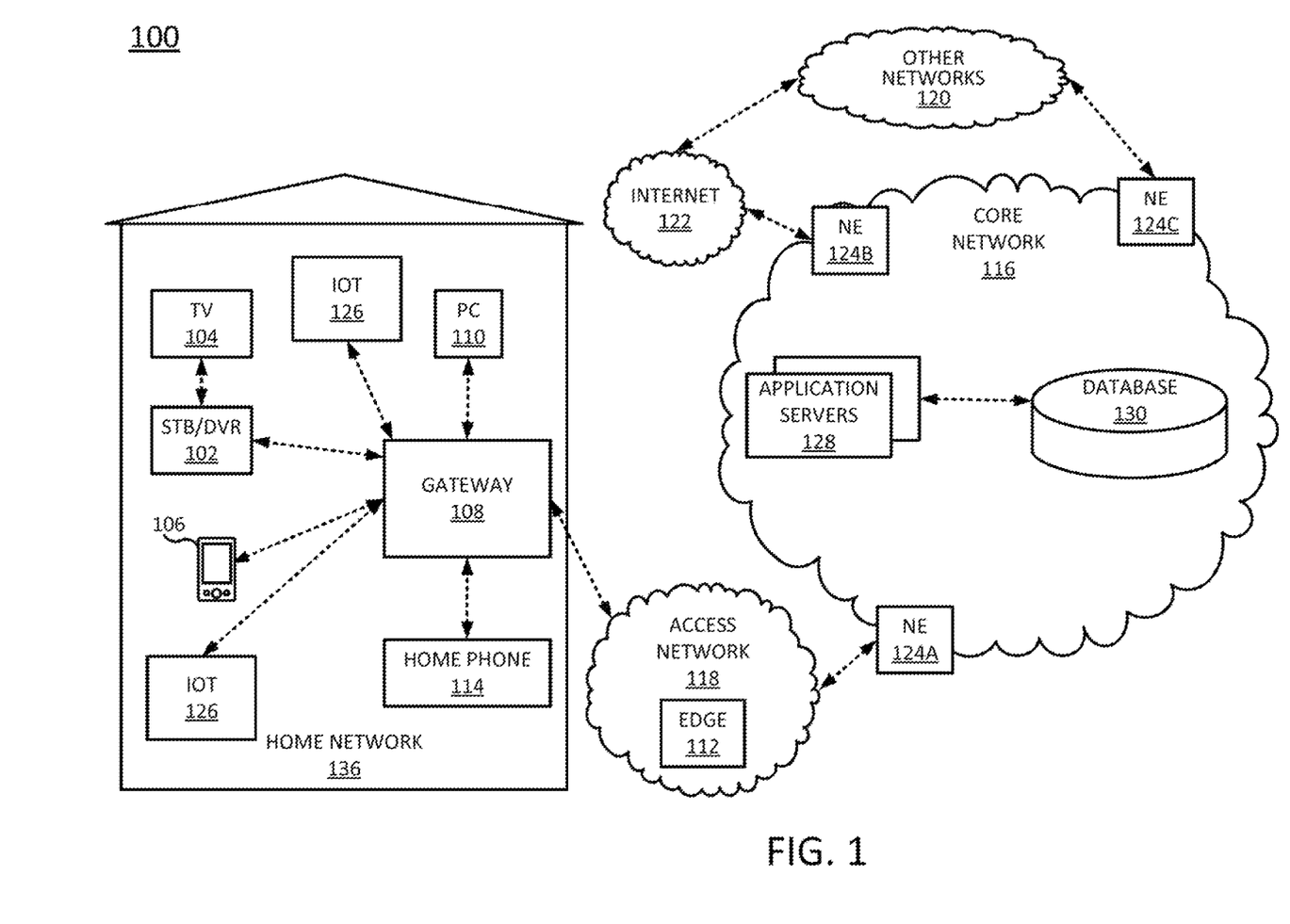
FIG. 1 illustrates an example system related to the present disclosure.

To better understand the present disclosure, FIG. 1 illustrates an example system 100 related to the present disclosure. As shown in FIG. 1, the system 100 may comprise a network 116, e.g., a telecommunication service provider network, a core network, or an enterprise network comprising infrastructure for computing and communications services of a business, an educational institution, a governmental service, or other enterprises. The network 116 may be in communication with one or more access networks (e.g., access network 118), other networks 120, and the Internet 122 via one or more network elements (NEs) 124A-C (e.g., border elements). In one example, network 116 may combine core network components of a cellular network with components of a triple play service network; where triple-play services include telephone services, Internet or data services and television services to subscribers. For example, network 116 may functionally comprise a fixed mobile convergence (FMC) network, e.g., an IP Multimedia Subsystem (IMS) network. In addition, network 116 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 116 may further comprise a broadcast television network, e.g., a traditional cable provider network or an internet Protocol Television (IPTV) network, as well as an Internet Service Provider (ISP) network. In one example, network 116 may include a plurality of television (TV) servers (e.g., a broadcast server, a cable head-end), a plurality of content servers, an advertising server (AS), an interactive TV/video on demand (VoD) server, and so forth.

In one example, the access network 118 may comprise a broadband optical and/or cable access network, a Local Area Network (LAN), a wireless access network (e.g., an IEEE 802.11/Wi-Fi network and the like), a cellular access network, a Digital Subscriber Line (DSL) network, a public switched telephone network (PSTN) access network, a $3^{rd}$ party network, and the like. For example, the operator of network 116 may provide a cable television service, an IPTV service, or any other types of telecommunication service to subscribers via access network 118. In one example, the network 116 may be operated by a telecommunication network service provider. The network 116 and the access network 118 may be operated by different service providers, the same service provider or a combination thereof, or may be operated by entities having core businesses that are not related to telecommunications services, e.g., corporate, governmental or educational institution LANs, and the like. As shown in FIG. 1, the network 116 may also include a plurality of application servers 128 and a database 130. For ease of illustration, various additional elements of core network 116 are omitted from FIG. 1.

In accordance with the present disclosure, network 116 may include a plurality of application servers (AS) 128, each of which may comprise a computing system or server, such as computing system 400 depicted in FIG. 4, and may be configured to provide services to devices in a home network 136, as discussed in further detail below. The network 116 may also include at least one database (DB) 130 that is communicatively coupled to the AS 128. For instance, an AS 128 may provide a streaming media service, such as a streaming video service, and the DB 130 may store video content that can be accessed via the streaming video service. Alternatively, an AS 128 may provide an immersive gaming service, and the DB 130 may store interactive game objects that can be rendered by the immersive gaming service.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, it should be noted that any number of servers and any number of databases may be deployed in the network 116. Furthermore, these servers and databases may operate in a distributed and/or coordinated manner as a processing system to perform operations in connection with the present disclosure.

Figure 4:
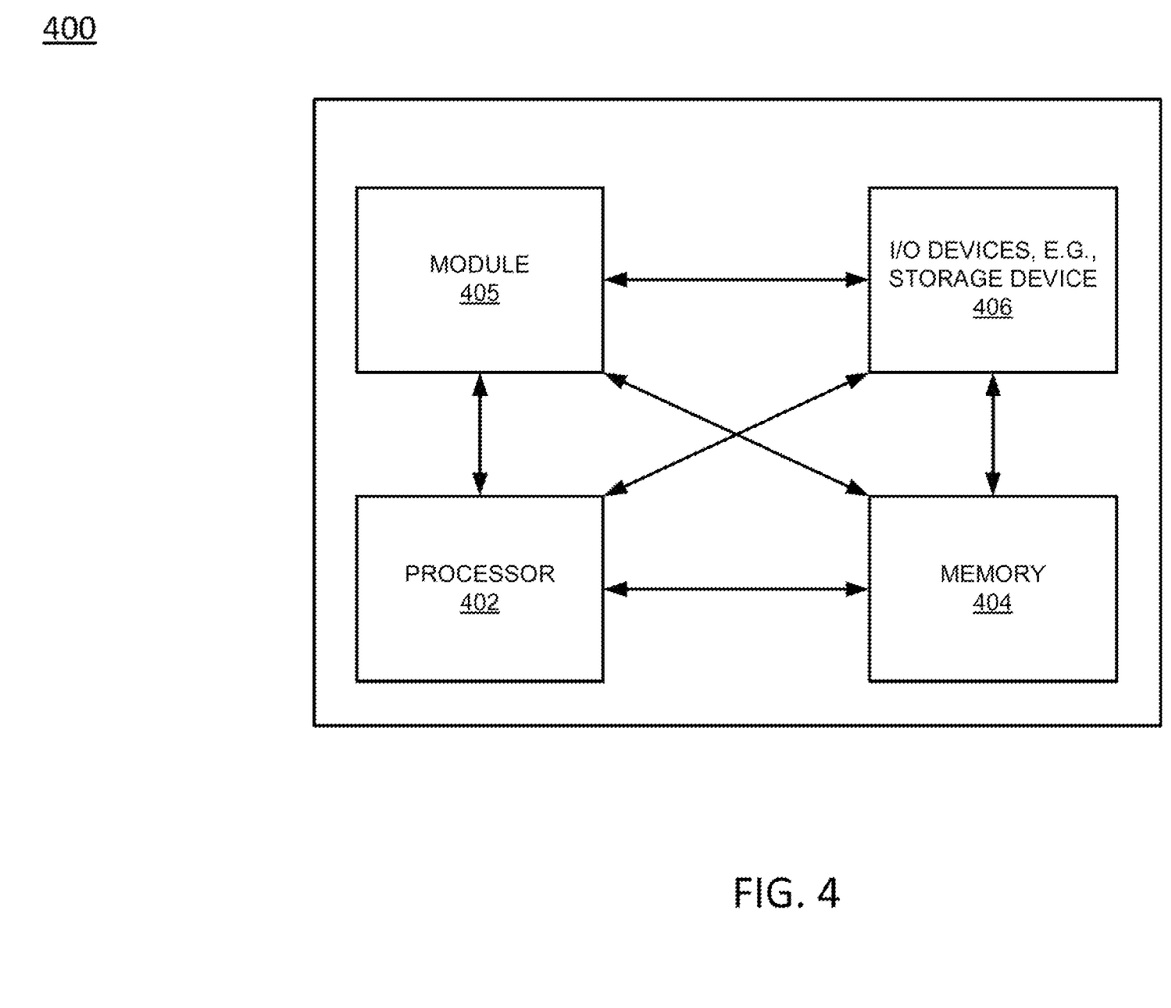
FIG. 4 depicts a high-level block diagram of a computing device specifically programmed to perform the functions described herein.

In one example, access network 118 may include an edge server 112, which may comprise a computing system or server, such as computing system 400 depicted in FIG. 4, and may be configured to provide any of the services provided by any of the application servers 128.

In one example, any of the application servers 128 may comprise a network function virtualization infrastructure (NFVI), e.g., one or more devices or servers that are available as host devices to host virtual machines (VMs), containers, or the like comprising virtual network functions (VNFs). In other words, at least a portion of the network 116 may incorporate software-defined network (SDN) components. Similarly, in one example, access network 118 may comprise an "edge cloud," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 118 comprises a radio access network, the nodes and other components of the access network 118 may be referred to as a mobile edge infrastructure. As just one example, edge server 112 may be instantiated on one or more servers hosting virtualization platforms for managing one or more virtual machines (VMs), containers, microservices, or the like. In other words, in one example, edge server 112 may comprise a VM, a container, or the like.

In one example, home network 136 may include a gateway device 108 (e.g., a residential gateway), which receives streams of data associated with different types of media, e.g., television, phone, and Internet, and separates these communications for the appropriate digital devices to which the gateway device 108 is connected. The streams of data may be received via access network 118, for instance. In one example, television data files are forwarded to a smart television (TV) 104 to be decoded, recorded, and/or displayed. Similarly, Internet communications are sent to and received from gateway device 108, which may be capable of both wired and/or wireless communication. In turn, gateway device 108 receives streams of data from and sends streams of data to the appropriate devices, e.g., mobile phone 106, personal computer (PC) 110, home phone 114, IoT devices 126, and/or other devices. Each of these devices may be configured to support media content of particular file formats. TV 104 may also be configured to support media content of particular file formats. In one example, gateway device 108 may comprise a wired Ethernet router and/or an Institute for Electrical and Electronics Engineers (IEEE) 802.11 (Wi-Fi) router, and may communicate with respective devices in home network 136 via wired and/or wireless connections.

In one example, the gateway device 108 may be configured to perform functions in connection with examples of the present disclosure for implementing programmable security specifications in home routers. For instance, as discussed in greater detail below, the gateway device may monitor network traffic that is flowing into and out of the home network 136 (e.g., network traffic for which any of the TV 104, mobile phone 106, personal computer (PC) 110, home phone 114, and/or IoT devices 126 is a source or destination).

The gateway device 108 may collect and track statistics from the network traffic that is monitored. The statistics may include at least one of: an expected number of flows or packets per device in the home network (where the different devices in the home network may be differentiated based on media access control (MAC) address or other identifiers), an expected flow size per device (e.g., a large flow containing a video to be uploaded to a video hosting site or a social media site might be normal for a specific device, whereas a large flow destined for an IP address associated with a site that is known to be malicious may be unusual for the specific device), the identities of the devices (e.g., MAC addresses) connected to the gateway device, the types of devices (e.g., mobile phone, laptop computer, desktop computer, IoT device, etc.) connected to the gateway device, and the times (e.g., times of day, days of week, etc.) during which specific devices access the telecommunications network.

From the statistics that are collected and tracked, the gateway device 108 may construct a model of "normal" or "typical" network traffic that flows into and out of the home network 136. That is, the gateway device 108 may identify patterns in the network traffic flowing into and out of the home network 136, where these patterns may represent expected network traffic flows. Once the gateway device 108 has determined what network traffic is expected in the home network (e.g., expected types of flows, expected times, expected durations, expected devices, expected volumes, etc.), the gateway device 108 may be able to further determine when network traffic flowing into or out of the home network 136 is anomalous, not expected, uncharacteristic, or having a statistically significant deviation from a norm. Anomalous network traffic events may, in some cases, be indicative of a network security breach involving the home network 136. For instance, the PC 110 may suddenly begin sending an unusually large volume of packets to a remote server (e.g., an application server 128) with which the PC 110 has never communicated. This may potentially be indicative of the PC 110 having been compromised and exploited to perpetuate a DDoS attack on the remote server.

Once the gateway device 108 has identified an anomaly in the network traffic flowing into and/or out of the home network 136, the gateway device 108 may generate a rule based on the anomaly. The rule may comprise a match-action rule that specifies an action to be taken when an event is detected that matches an event specified by the rule. For instance, the event may be the detection of packets destined for a device in the home network (e.g., a printer) in the middle of the night, where the source of the packets is an unknown server (i.e., a server with which the printer has never previously communicated). The action associated with the event may be for the gateway device 108 to drop the packets (i.e., not deliver the packets to the printer).

The gateway device 108 may then deploy the rule, on the gateway device 108. Thus, the gateway device 108 will apply the rule to any network traffic flowing through the gateway device 108 that matches the rule. This will allow the gateway device 108 to provide improved security to the home network 136, as the gateway device 108 is in a unique position to determine what types of outgoing and incoming network traffic are to be expected (e.g., typical) in the home network 136, and what types of network traffic are not expected (e.g., atypical). In addition, by potentially preventing exploitation of any devices in the home network for use in attacks perpetrated on the larger network (e.g., application servers 128 in the core network 116 and/or other devices in the network beyond the home network 136), the gateway device 108 may also provide improved security to the larger network.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 116 is not limited to an IMS network. Similarly, the present disclosure is not limited to an IP/MPLS network for VoIP telephony services, or any particular type of broadcast television network for providing television services, and so forth.

Figure 2:
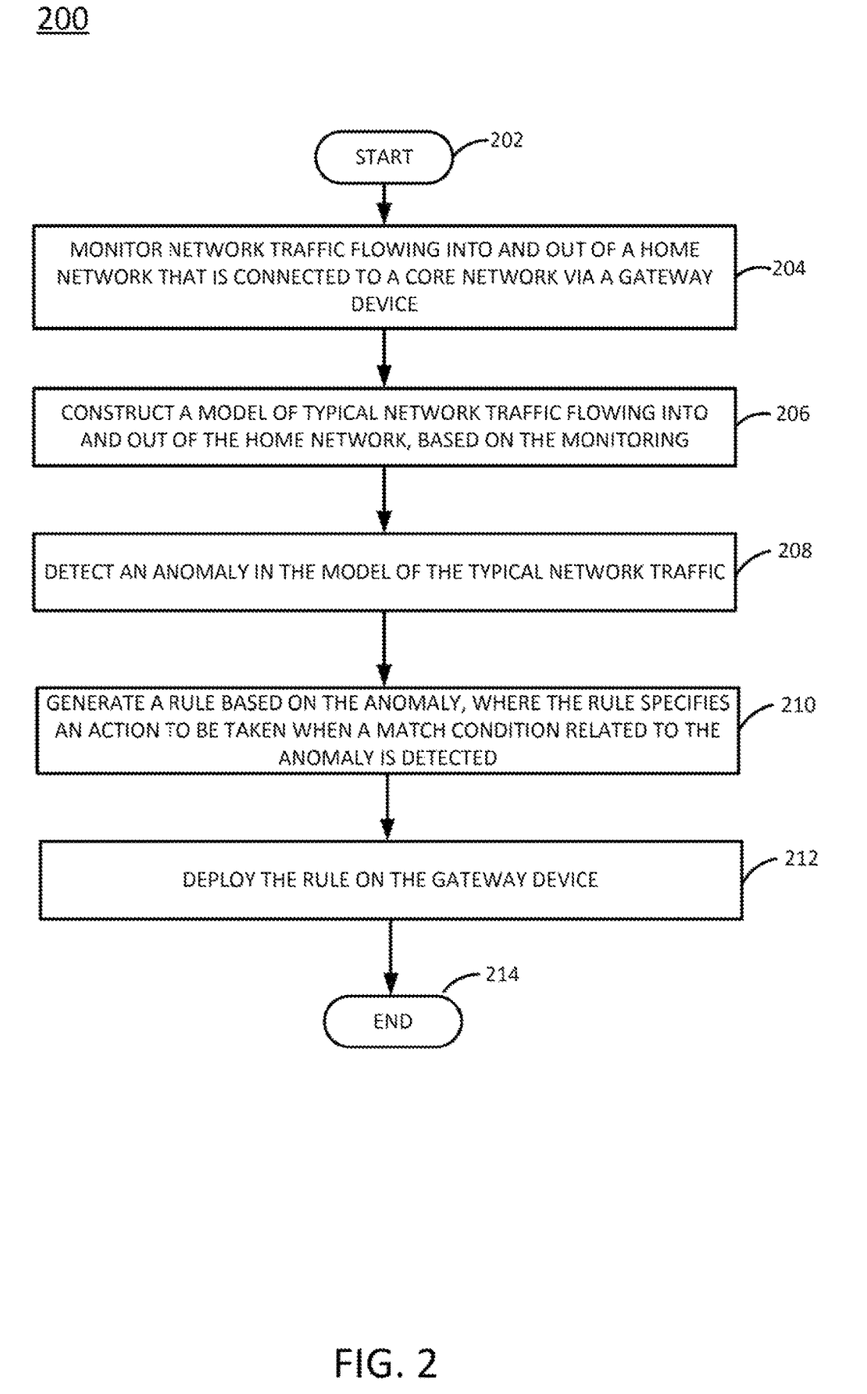
FIG. 2 illustrates a flowchart of an example method for implementing programmable security specifications in a home router.

To further aid in understanding the present disclosure, FIG. 2 illustrates a flowchart of an example method 200 for implementing programmable security specifications in home routers. Specifically, FIG. 2 illustrates a method by which a network security rule may be inferred and deployed on a gateway device (e.g., a residential gateway of a home network). In one example, the method 200 may be performed by the gateway device 108 illustrated in FIG. 1. However, in other examples, the method 200 may be performed by another device, such as the computing system 400 of FIG. 4, discussed in further detail below. For the sake of discussion, the method 200 is described below as being performed by a processing system (where the processing system may comprise a component of the gateway device 108, the computing system 400, or another device).

The method 200 begins in step 202. In step 204, the processing system may monitor network traffic flowing into and out of a home network that is connected to a core network via a gateway device.

As discussed above, in one example, the processing system may be part of a gateway device that serves a home network and that connects devices in the home network to the core network (e.g., via an access network). Thus, all network traffic for which the devices in the home network are the source or the destination may flow through the gateway device, giving the gateway device a unique view as to what constitutes "typical" traffic flow (broadly, "normal" or "expected" traffic flow based on a measuring of traffic flow over a period of time, e.g., over a week, over a month, over a quarter of a year, etc.) for the home network and what may constitute "abnormal" or "anomalous" traffic flow (broadly, "atypical" or "unexpected" traffic flow based on the measuring of traffic flow over a period of time, e.g., over a week, over a month, over a quarter of a year, etc.) for the home network.

In one example, monitoring the network traffic may include tracking one or more statistics from which the processing system can construct a model of what "normal" or "expected" network traffic for the home network looks like. In a further example, the statistics may include at least one of: an expected number of flows or packets per device in the home network (where the different devices in the home network may be differentiated based on media access control (MAC) address or other identifiers), an expected flow size per device (e.g., a large flow containing a video to be uploaded to a video hosting site or a social media site might be normal for a specific device, whereas a large flow destined for an IP address associated with a site that is known to be malicious may be unusual for the specific device), the identities of the devices (e.g., MAC addresses) connected to the gateway device, the types of devices (e.g., mobile phone, laptop computer, desktop computer, IoT device, etc.) connected to the gateway device, and the times (e.g., times of day, days of week, etc.) during which specific devices access the telecommunications network.

In one example, the processing system may utilize P4 telemetry to collect the statistics at the gateway device. P4 telemetry allows, for example, the creation of counters and meters that can track a number of packets or flows associated with a specific source or destination IP address or MAC address, that can measure the sizes of packets or flows, and that can measure the frequencies of flows.

In step 206, the processing system may construct a model of network traffic (e.g., a model of typical network traffic) flowing into and out of the home network, based on the monitoring. In one example, constructing the model comprises constructing a time series from the statistics that are tracked. In this case, the time series may comprise a series of values that indicate the size of the network traffic flow (incoming and/or outgoing) associated with a specific device in the home network, over time.

In step 208, the processing system may detect an anomaly in the model of the typical network traffic. Within this context, an anomaly is an instance in which a measured value or feature (e.g., a value for any of the statistics described above) deviates from the expected value (e.g., as defined by the model of the typical network traffic) by more than a threshold. In one example where the model of typical network traffic comprises a time series, the processing system may apply forecasting over the time series to discover anomalies in the network traffic flow associated with a specific device in the home network. There are many different ways to perform forecasting over a time series, with the differences lying mainly in how seasonality and trends are handled. For instance, seasonality could be handled by allowing anomaly detection to consider the possibility that the home network may see greater use—and therefore larger, more frequent traffic flows—during weekends and over holidays. As another example, consideration of a trend may account for the possibility that home network usage may grow over time. In one example, the processing system may use at least one of the following techniques to apply forecasting over the time series: autoregression (AR), moving average (MA), autoregressive moving average (ARMA), autoregressive integrated moving average (ARIMA), seasonal autoregressive integrated moving average (SARIMA), seasonal autoregressive integrated moving average with exogenous regressors (SARIMAX), simple exponential smoothing (SES), Holt Winter's Exponential Smoothing (HWES), and/or other techniques.

In one example, a univariate forecasting technique may be applied to detect an anomaly within a single time series (i.e., representative of a single statistic over time). However, in other examples, the time series of a plurality of different statistics (i.e., representative of a plurality of different statistics over time) may be combined by executing a multivariate forecasting technique, such as vector autoregression (VAR), vector autoregression moving average (VARMA), vector autoregression moving average with exogenous regressors (VARMAX), and/or other techniques. Applying a multivariate forecasting technique for anomaly detection would allow the processing system to correlate anomalies (as well as normal activity) across different statistics.

For instance, a correlation may exist between usage of a gaming console and a smart phone belonging to a child being present in the home that is served by the home network. This may be the case where the smartphone is present in the home when the child is in the home, and where the gaming console is only ever used when the child is present in the home. Correlations between the presence of smart phones in the home and network usage will be reflected in the network traffic that is monitored by the processing system, will influence the model of typical network traffic, and will ultimately lead to better anomaly detection. As an example, increased network usage while all residents of a home are present is more likely than increased network usage while no residents of the home are present. For example, whether or not a resident is present in the home may be determined by whether or not the resident's smart phone is connected to the home's WiFi router.

In further examples, more complex models, such as the Prophet forecasting model, or models based on recurrent neural networks (RNNs) like long short-term memory or transformers, may be trained to detect anomalies in the time series.

In step 210, the processing system may generate a rule based on the anomaly, where the rule specifies an action to be taken when a match condition related to the anomaly is detected. In one example, the rule that is generated is a P4 rule that can be applied at line rate (i.e., at the speed by which packets are processed by the gateway device). In one example, the P4 rule is a match-action rule that includes two parts, i.e., an action part that specifies an action to be taken, and a match part that specifies when the action should be taken. For instance, a rule may specify that when a packet is sent to a specific destination (match), a counter that tracks a number of packets sent to the specific destination should be incremented by one and a meter that tracks a size of data sent to the specific destination should be incremented by the size of the packet (action).

Thus, the match portion of the P4 rule may relate to a particular packet field (e.g., source IP address, destination IP address, source port, destination port, source MAC address, destination MAC address, payload size, etc.). In a further example, the match portion of the P4 rule may also relate to properties of flows or to values measured by counters and meters for sets of packets whose attributes satisfy a predefined condition.

The action portion of the P4 rule specifies an action to be taken when the match portion of the P4 rule is satisfied. Actions may include, for example, dropping packets, generating an alert to notify a human user, an administrator, or an automated system of the anomalous activity, sending information to a network service provider, or the like.

As an example, an anomaly may comprise an unusual amount of traffic being sent to a particular destination IP address as part of a DDoS attack. A rule generated based on this anomaly may specify that when the destination IP address of a packet is the same as the particular destination IP address (match portion), the packet should be dropped (action portion). Thus, the rule may not explicitly check for an anomaly in the network traffic, but may help to mitigate threats that are indicated by anomalies.

In another example, a P4 rule may specify that packets exhibiting certain properties (e.g., the destination IP address is associated with a server that is currently experiencing a DDoS attack) should be dropped.

In another example, a P4 rule may specify that when anomalous activity is detected, a user (e.g., a human user or administrator) should be notified with an alert that will allow compromised devices to be shut down or will allow examination of compromised devices by a technician. For instance, an alert packet could be sent to an alert service of the gateway device, where the alert packet may be created and sent with parameters that indicate the type of alert and details regarding the conditions that triggered the alert.

In another example, a P4 rule may specify that when an anomalous or unexpected activity is detected, information about the activity (e.g., clones of packets associated with the anomalous or unexpected activity) should be sent to the network service provider. Sending information about the activity to the network service provider may allow the network service provider to detect DDoS attacks or phishing activities early and to add intervention rules to the gateway device to mitigate the DDoS attacks or phishing activities.

In step 212, the processing system may deploy the rule on the gateway device. Deploying the rule on the gateway device may allow the gateway device to enforce the rule against any network traffic flowing into and out of the home network, thereby securing the home network against attacks. Moreover, the gateway device can also provide a measure of security to the larger network as well by preventing potentially malicious traffic from exiting the home network (e.g., as in the case of a DDoS attack).

The method 200 may end in step 214.

However, it will be appreciated that the method 200, or steps of the method 200, may be repeated. For instance, rules that are deployed on the gateway device may be periodically updated in order to combat the dynamic and evolving nature of network security threats. Moreover, new rules may be generated to combat newly developed network security threats. Thus, rules may be added and removed frequently.

Figure 3:
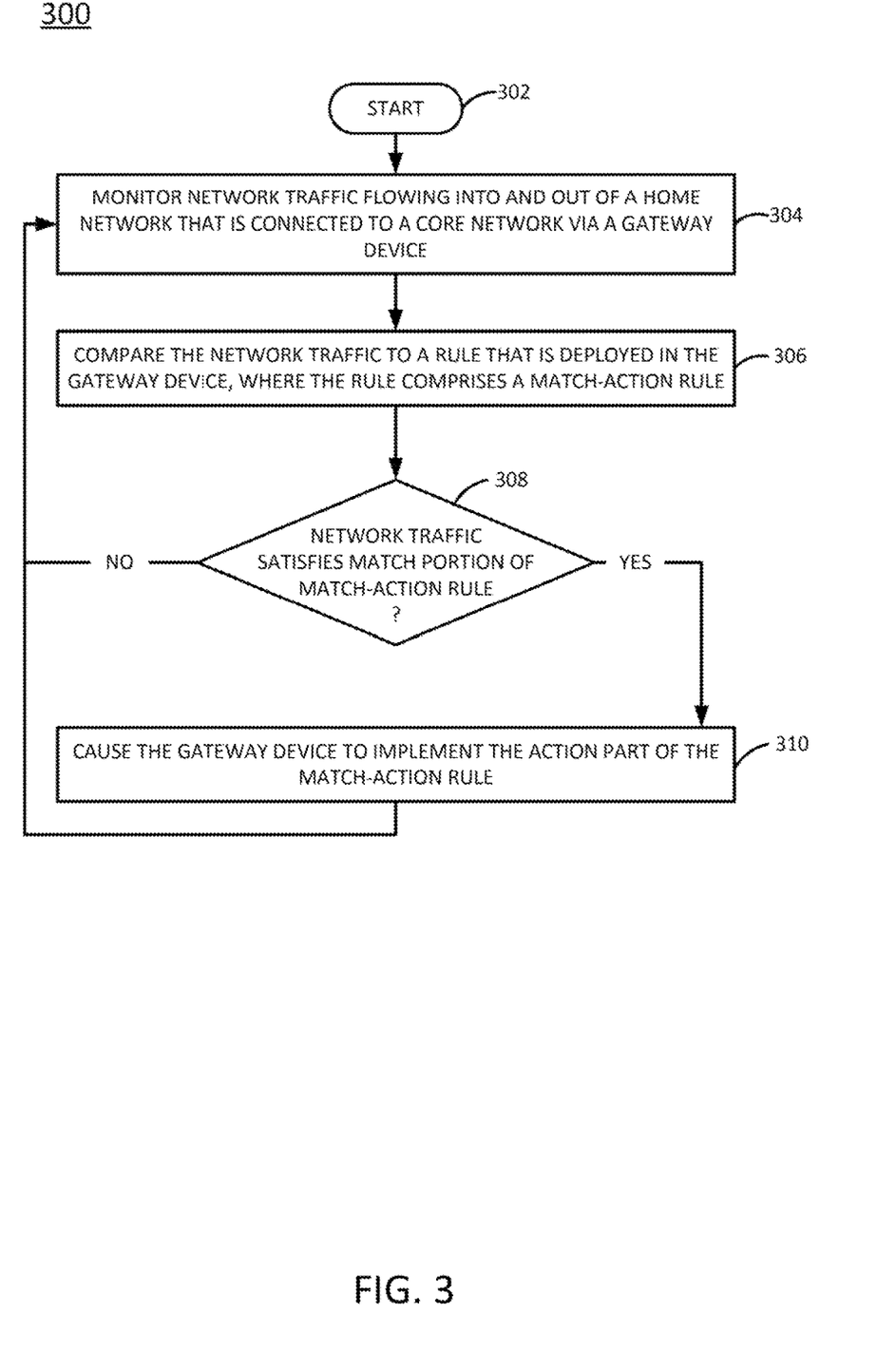
FIG. 3 illustrates a flowchart of an example method for implementing programmable security specifications in a home router.

To further aid in understanding the present disclosure, FIG. 3 illustrates a flowchart of an example method 300 for implementing programmable security specifications in home routers. Specifically, FIG. 3 illustrates a method by which a network security rule that is deployed on a gateway device (e.g., a residential gateway of a home network) may be used to detect and mitigate potential network security threats. In one example, the method 300 may be performed by the gateway device 108 illustrated in FIG. 1. However, in other examples, the method 300 may be performed by another device, such as the computing system 400 of FIG. 4, discussed in further detail below. For the sake of discussion, the method 300 is described below as being performed by a processing system (where the processing system may comprise a component of the gateway device 108, the computing system 400, or another device).

The method 300 begins in step 302. In step 304, the processing system may monitor network traffic flowing into and out of a home network that is connected to a core network via a gateway device.

As discussed above, in one example, the processing system may be part of a gateway device that serves a home network and that connects devices in the home network to the core network (e.g., via an access network). Thus, all network traffic for which the devices in the home network are the source or the destination may flow through the gateway device.

In one example, monitoring the network traffic may include tracking one or more statistics of the network traffic. In a further example, the statistics may include at least one of: a number of flows or packets per device in the home network (where the different devices in the home network may be differentiated based on media access control (MAC) address or other identifiers), a flow size per device, the identities of the devices (e.g., MAC addresses) connected to the gateway device, or the types of devices (e.g., mobile phone, laptop computer, desktop computer, IoT device, etc.) connected to the gateway device.

In one example, the processing system may utilize P4 telemetry to collect the statistics at the gateway device. P4 telemetry allows, for example, the creation of counters and meters that can track a number of packets or flows associated with a specific source or destination IP address or MAC address, that can measure the sizes of packets or flows, and that can measure the frequencies of flows.

In step 306, the processing system may compare the network traffic to a rule deployed in the gateway device, where the rule comprises a match-action-rule. In one example, the match-action rule includes two parts, i.e., an action part that specifies an action to be taken, and a match part that specifies when the action should be taken. For instance, a rule may specify that when a packet is sent to a specific destination (match), a counter that tracks a number of packets sent to the specific destination should be incremented by one and a meter that tracks a size of the data sent to the specific destination should be incremented by the size of the packet (action).

Thus, the match portion of a rule may relate to a particular packet field (e.g., source IP address, destination IP address, source port, destination port, source MAC address, destination MAC address, payload size, etc.). In a further example, the match portion of the rule may also relate to properties of flows or to values measured by counters and meters for sets of packets whose attributes satisfy a predefined condition.

The action portion of the rule specifies an action to be taken when the match portion of the rule is satisfied. Actions may include, for example, dropping packets, generating an alert to notify a human user, an administrator, or an automated system of the anomalous activity, sending information to a network service provider, or the like.

In step 308, the processing system may determine whether the network traffic satisfies the match portion of the match-action rule. As discussed above, the match portion of the match-action rule may relate to a particular packet field (e.g., source IP address, destination IP address, source port, destination port, source MAC address, destination MAC address, payload size, etc.). In a further example, the match portion of the rule may also relate to properties of flows or to values measured by counters and meters for sets of packets whose attributes satisfy a predefined condition. Thus, the processing system may determine whether the values contained in any fields of any packets contained in the network traffic match values specified by the match portion of the match-action rule. For instance, if the match portion of the match-action rule specifies an IP address contained in a destination field of a packet header, the network traffic may satisfy the match portion when the packet headers of the packets of the network traffic include the specified IP address in the destination field.

A plurality of match-action rules may be defined for the network traffic, where each match-action rule may specify a different combination of match portion and action portion. In this case, it is noted that the processing system may compare the network traffic to all of the match-action rules that are defined, and may identify any number of the match-action rules whose match portions are satisfied by the network traffic. However, in order to proceed further in the method 300 (e.g., to at least step 310, discussed in further detail below), the network traffic must satisfy the match portion of at least one match-action rule. Thus, any reference within the discussion of the method 300 to a "rule" may apply equally to a set of multiple rules.

If the processing system concludes in step 308 that the network traffic does not satisfy the match portion of the match-action rule, then the method 300 may return to step 304, and the processing system may continue to monitor the network traffic flowing into and out of the home network.

If, however, the processing system concludes in step 308 that the network traffic does satisfy the match portion of the match-action rule, then the method 300 may proceed to step 310. In step 310, the processing system may cause the gateway device to implement the action part of the match-action rule.

As discussed above, the match-action rule will specify an action to be taken when a match condition of the match-action rule is satisfied. For instance, in one example, a rule may specify that packets exhibiting certain properties (e.g., the destination IP address is associated with a server that is currently experiencing a DDoS attack) should be dropped.

In another example, a rule (or set of rules) may specify that when an anomalous activity is detected, a user (e.g., a human user or administrator) should be notified with an alert that will allow compromised devices to be shut down or will allow examination of compromised devices by a technician. For instance, an alert packet could be sent to an alert service of the gateway device, where the alert packet may be created and sent with parameters that indicate the type of alert and details regarding the conditions that triggered the alert.

In another example, a rule may specify that when an anomalous or unexpected activity is detected, information about the activity (e.g., clones of packets associated with the anomalous or unexpected activity) should be sent to the network service provider. Sending information about the activity to the network service provider may allow the network service provider to detect DDoS attacks or phishing activities early and to add intervention rules to the gateway device to mitigate the DDoS attacks or phishing activities.

Once the processing system has caused the gateway device to implement the action part of the match-action rule (or the action parts of multiple match-action rules), the method 300 may return to step 304, and the processing system may continue to monitor the network traffic flowing into and out of the home network.

Thus the method 300, or steps of the method 300, may be repeated as the processing system continues to monitor the network traffic flowing into and out of the home network for potential security threats and to cause the gateway device to take appropriate action when evidence of potential security threats is detected in the network traffic.

In one example, a user of the home network may be able to view the rules that are deployed on the gateway device and to make modifications to the rules. For instance, the rules may block access to specific web sites by devices in the home network (e.g., by causing the gateway device to drop packets whose destination IP address corresponds to a blocked web site). The user may be able to view a list of the blocked web sites (i.e., a blacklist) and to lift restrictions on web sites that the user does not wish to be blocked. For instance, the user may simply delete a match-action rule that causes the gateway device to drop all packets for which the destination IP address is a web site that the user does not wish to be blocked. The user may also configure a whitelist of specific web sites which devices in the home network should be permitted to access.

As discussed above, some rules may cause the gateway device to report to the network service provider when certain events are detected in the network traffic flowing into and out of the home network. As such, the network service provider may collect data (e.g., reports) from a plurality of gateway devices connecting a plurality of home networks to the core network. This may allow the network service provider to detect potential security threats earlier and to thereby minimize the damage the security threats may inflict on the network. For instance, events indicative of a DDoS attack that exploits devices in home networks (e.g., desktop computers, laptop computers, IoT devices, etc.) may be reported to the network service provider by multiple gateway devices before the DDoS attack can be fully carried out. Reports indicative of phishing attempts may also help a network service provider to identify web sites that are used for phishing and to push rules blocking those web sites to the gateway devices before more user data can be compromised. Conversely, if multiple gateway devices report that a particular blocked web site is actually legitimate or harmless, then the network service provider may notify the gateway devices that the rules blocking the particular web site can be deleted.

In one example, precision time protocol (PTP/IEEE-1588) may be used to synchronize different gateway devices with each other and to synchronize the different gateway devices with the servers of the network service provider. PTP/IEEE-1588 is a method that precisely synchronizes computers over a local area network (LAN). On a network specifically designed for the IEEE-1588 standard, PTP/IEEE-1588 may synchronize multiple clocks with less than one hundred nanoseconds difference between the clocks. This ability may help with the detection of short duration distributed attacks or distributed anomalous events.

In some examples, access to a gateway device may require strong authentication to prevent unauthorized individuals from making changes in the gateway device. For instance, the gateway device may authenticate the network service provider based on cryptographic keys. Authentication of a user may be limited to the user direct physical access to the gateway device only when the user is making changes. The user may be permitted to add web sites to a whitelist, or remove web sites from a blacklist, only when directly connected to the gateway device.

Rules that are deployed on a gateway device may be limited in time and in generality (e.g., a rule that drops all packets destined to a particular IP address and particular port is less general than a rule that drops all packets destined for a particular port regardless of IP address).

Although not expressly specified above, one or more steps of the method 200 or 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIGS. 2 and 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Thus, examples of the present disclosure may learn the expected behavior patterns of a telecommunications network, both on the home network side and the global network side. Then, when anomalous behaviors are detected, these anomalous behaviors may be automatically translated into security specifications. The security specifications may be deployed in the home gateway of a home network that is part of the telecommunications network. The security specifications may help to mitigate security threats to the telecommunications network. For instance, many types of network security threats, including distributed denial of service (DDoS) attacks, phishing attempts, identity theft, and the like can be blocked or at least mitigated at the home gateway, as long as the home gateway is configured to detect packets and flows that are part of such security threats and to apply countermeasures (e.g., dropping packets, delaying packets, marking packets as suspicious, etc.).

Although examples of the present disclosure are discussed herein within the context of protecting a home network, it is noted that the same principles can be applied to protect to any private network that provides network connectivity to a limited number of individuals. For instance, in addition to a home, the examples disclosed herein could be implemented in gateway device that serves an office building or campus, a school building or campus, a hospital, a public building such as a museum, a restaurant, or a transportation hub, or the like.

As discussed above, the development and deployment of security rules on the gateway devices may be dynamic, such that rules may be added and deleted at any time in response to changing security threats. For instance, when a DDoS attack is initially detected (e.g., due to several gateway devices reporting anomalies that may be indicative of a DDoS attack, such as an unusually large number of outbound packets destined for the same IP address), the network service provider may push a rule to the gateway devices, where the rule causes a gateway device to drop packets whose destination IP addresses match the IP address of the server being attacked. Once the DDoS attack ends, however, this rule may be deleted (such that a gateway device will no longer drop packets whose destination IP addresses match the IP address of the server that was being attacked).

In another example, when a phishing attempt is detected, the network provider may push a rule to the gateway devices, where the rule causes the gateway devices to block access by devices in the respective home networks to the web site associated with the phishing attempt. However, if a user in a home network does, in fact, wish to access the blocked web site—even after being warned of the potential phishing attempt—the user may manually delete the rule from the respective gateway device.

In another example, when an anomaly is detected, a gateway device may send an alert to the network provider and may even deploy a rule to block the network traffic associated with the anomaly. However, when the anomaly is resolved and the network traffic resumes expected patterns, the rule may be deleted. For instance, if a larger than expected volume of network traffic is suddenly detected originating from a camera in the home network, the gateway device may deploy a rule that drops all packets originating from the IP address or MAC address of the camera. However, if a user of the home network subsequently authorizes the increase in network traffic from the camera, then the rule may be deleted. Similarly, if a printer in the home network establishes a connection with an unknown web site at a time when there is normally relatively little network traffic coming into or going out of the home network (e.g., the middle of the night), the gateway device may deploy a rule that drops packets originating from the IP address associated with the unknown web site. However, if the user subsequently authorizes the connection to the unknown web site, then the rule may be deleted.

Because gateway devices such as residential gateways and home routers serve as the access points to a telecommunication network for millions of homes across the world, implementing actions such as blocking packets at the gateway devices can be an effective way to mitigate DDoS attacks and other types of network security threats. In addition, in cases where unauthorized individuals are attempting to exploit compromised systems in a home network (e.g., printers, IoT devices, wearable devices, etc.), the ability to block network traffic at the gateway device will reduce the overall load on the network, especially on routers and switches in the parts of the network that are affected by the attack. Intervention by the gateway device may also reduce the risk of IP address of exploited devices being added to network blacklists (in which cases users of the exploited devices may be denied access to important services).

Moreover, because network traffic is conducted with very short latency and in very short time periods, network traffic inspection is most effectively performed by the gateway device, at line rate. Packet forwarding is typically performed at the scale of microseconds, while anomaly detection may be performed at the scale of milliseconds. If further examination is necessary, network traffic can be delayed until an anomaly is tested or examined further. The delay may be implemented using rules that shift delayed packets or flows to a dedicated queue. For instance, if a flow of packets originating from a known device in the home network is detected at a time that is unusual for that device or at a volume that is unusual for that device, then the packets originating from that device could be delayed until inspection and authorization of the packets can be performed.

FIG. 4 depicts a high-level block diagram of a computing device specifically programmed to perform the functions described herein. For example, any one or more components or devices illustrated in FIG. 1 or described in connection with the methods 200 or 300 may be implemented as the system 400. For instance, the residential gateway 108 of FIG. 1 (such as might be used to perform the method 200 or the method 300) could be implemented as illustrated in FIG. 4.

As depicted in FIG. 4, the system 400 comprises a hardware processor element 402, a memory 404, a module 405 for implementing programmable security specifications in a home router, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for implementing programmable security specifications in a home router may include circuitry and/or logic for performing special purpose functions relating to managing network security from the home network side. The input/output devices 406 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for implementing programmable security specifications in a home router (e.g., a software program comprising computer-executable instructions) can be loaded into memory 404 and executed by hardware processor element 402 to implement the steps, functions or operations as discussed above in connection with the example methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for implementing programmable security specifications in a home router (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
monitoring, by a processing system including at least one processor, network traffic flowing into and out of a home network that is connected to a core network of a telecommunications network via a gateway device;
constructing, by the processing system, a model of the network traffic flowing into and out of the home network, based on the monitoring;
detecting, by the processing system, an anomaly in the model of the network traffic;
generating, by the processing system, a rule based on the anomaly, where the rule specifies an action to be taken when a match condition related to the anomaly is detected; and deploying, by the processing system, the rule on the gateway device.

2. The method of claim 1, wherein the processing system is part of the gateway device.

3. The method of claim 1, wherein the monitoring comprises tracking statistics that are used for constructing the model of the network traffic.

4. The method of claim 3, wherein the statistics include at least one of: an expected number of flows or packets per device in the home network, an expected flow size per device in the home network, identities of devices in the home network that are connected to the gateway device, types of the devices in the home network that are connected to the gateway device, or times during which specific devices of the devices in the home network that are connected to the gateway device access the telecommunications network.

5. The method of claim 3, wherein the statistics are tracked using programming protocol-independent packet processors telemetry.

6. The method of claim 3, wherein the constructing comprises constructing a time series from the statistics.

7. The method of claim 6, wherein the anomaly comprises an instance in which a measured value for any of the statistics deviates from an expected value as reflected in the time series by more than a threshold.

8. The method of claim 7, wherein the anomaly is detected by applying forecasting over the time series.

9. The method of claim 8, wherein the forecasting is applied using a univariate forecasting technique.

10. The method of claim 9, wherein the univariate forecasting technique is at least one of: autoregression, moving average, autoregressive moving average, autoregressive integrated moving average, seasonal autoregressive integrated moving average, seasonal autoregressive integrated moving average with exogenous regressors, simple exponential smoothing, or holt winter's exponential smoothing.

11. The method of claim 8, wherein the forecasting is applied using a multivariate forecasting technique.

12. The method of claim 11, wherein the multivariate forecasting technique comprises at least one of: vector autoregression, vector autoregression moving average, or vector autoregression moving average with exogenous regressors.

13. The method of claim 8, wherein the forecasting is applied using a prophet forecasting model or a model based on recurrent neural networks.

14. The method of claim 1, wherein the rule comprises a programming protocol-independent packet processors rule applied by the gateway device at a line rate.

15. The method of claim 14, wherein the rule comprises a match-action rule that includes an action part that specifies the action to be taken and a match part that specifies the match condition.

16. The method of claim 15, wherein the match condition relates to at least one of: a particular packet field, a property of a flow, or a value measured by a counter or a meter for sets of packets whose attributes satisfy a predefined condition.

17. The method of claim 15, wherein the action part causes the gateway device to perform at least one of: dropping a packet, generating an alert to notify a human user of an anomalous activity, or sending information to a network service provider.

18. The method of claim 15, further comprising:
comparing, by the processing system, the network traffic flowing into and out of the home network to the match-action-rule;
determining, by the processing system, that a property of the network traffic satisfies the match portion of the match-action rule; and
causing, by the processing system in response to the determining, the gateway device to implement the action part of the match-action rule.

19. A non-transitory computer-readable medium storing instructions which, when executed by a processing system including at least one processor, cause the processing system to perform operations, the operations comprising:
monitoring network traffic flowing into and out of a home network that is connected to a core network via a gateway device;
constructing a model of network traffic flowing into and out of the home network, based on the monitoring;
detecting an anomaly in the model of the network traffic;
generating a rule based on the anomaly, where the rule specifies an action to be taken when a match condition related to the anomaly is detected; and
deploying the rule on the gateway device.

20. A system comprising:
a processing system including at least one processor; and
a computer-readable medium storing instructions which, when executed by the processing system, cause the processing system to perform operations, the operations comprising:
monitoring network traffic flowing into and out of a home network that is connected to a core network via a gateway device;
constructing a model of network traffic flowing into and out of the home network, based on the monitoring;
detecting an anomaly in the model of the network traffic;
generating a rule based on the anomaly, where the rule specifies an action to be taken when a match condition related to the anomaly is detected; and
deploying the rule on the gateway device.

* * * * *